(12) United States Patent
Båversten et al.

(10) Patent No.: US 8,077,823 B2
(45) Date of Patent: Dec. 13, 2011

(54) JET PUMP RISER CLAMP

(75) Inventors: Bengt Båversten, Västerås (SE); Arto Suoniemi, Ransta (SE)

(73) Assignee: Westinghouse Electric Sweden AB, Vasteras (SE)

( * ) Notice: Subject to any disclaimer, the term of this patent is extended or adjusted under 35 U.S.C. 154(b) by 339 days.

(21) Appl. No.: 12/476,560

(22) Filed: Jun. 2, 2009

(65) Prior Publication Data

US 2010/0098206 A1    Apr. 22, 2010

Related U.S. Application Data

(63) Continuation of application No. PCT/SE2006/050580, filed on Dec. 14, 2006.

(51) Int. Cl.
G21C 9/00 (2006.01)
G21C 1/04 (2006.01)
B23P 6/00 (2006.01)
F16C 11/06 (2006.01)
F16L 25/00 (2006.01)
F16L 17/00 (2006.01)

(52) U.S. Cl. .......... 376/286; 376/352; 29/890.031; 403/24; 285/421; 277/314

(58) Field of Classification Search .......... 376/286, 376/352; 29/890.031; 403/24; 285/421; 277/314
See application file for complete search history.

(56) References Cited

U.S. PATENT DOCUMENTS

| | | | |
|---|---|---|---|
| 5,735,551 A | 4/1998 | Whitman et al. | |
| 5,839,192 A * | 11/1998 | Weems et al. | 29/890.031 |
| 5,964,029 A | 10/1999 | Weems et al. | |
| 6,053,652 A | 4/2000 | Deaver et al. | |
| 6,086,120 A | 7/2000 | Deaver et al. | |
| 6,108,391 A | 8/2000 | Deaver et al. | |
| 6,195,892 B1 * | 3/2001 | Weems et al. | 29/890.031 |
| 6,264,203 B1 | 7/2001 | Weems et al. | |
| 6,293,593 B1 | 9/2001 | Wivagg | |
| 6,305,651 B1 | 10/2001 | Wivagg | |
| 6,345,084 B1 | 2/2002 | Jensen | |
| 6,375,130 B1 | 4/2002 | Jensen et al. | |
| 6,375,230 B1 | 4/2002 | Jensen et al. | |
| 6,390,509 B1 | 5/2002 | Wivagg | |
| 6,421,406 B1 | 7/2002 | Jensen | |
| 6,456,682 B1 | 9/2002 | Jensen | |
| 6,464,424 B1 | 10/2002 | Weems et al. | |
| 6,467,814 B1 | 10/2002 | Wivagg | |
| 2005/0247754 A1 * | 11/2005 | Butler | 228/44.5 |
| 2006/0082139 A1 | 4/2006 | Jensen | |

* cited by examiner

*Primary Examiner* — Rick Palabrica
*Assistant Examiner* — Erin M Leach
(74) *Attorney, Agent, or Firm* — Alston & Bird LLP

(57) ABSTRACT

A clamp assembly for securing a thermal sleeve and an elbow in a pipe assembly in a nuclear reactor. The clamp assembly comprises a sleeve clamp adapted to be arranged surrounding the elbow at a first joint between the elbow and a thermal sleeve, and comprising a sleeve support adapted to extend across the first joint. The clamp assembly comprises at least one clamp arm with a first end arranged to rest against at least one of a core shroud and a core plate support ring, to provide support for the positioning of the sleeve clamp.

19 Claims, 5 Drawing Sheets

US 8,077,823 B2

JET PUMP RISER CLAMP

CROSS-REFERENCE TO RELATED APPLICATION

This application is a continuation of international patent application PCT/SE2006/050580 filed on Dec. 14, 2006, which is currently pending and which was published under PCT Article 21(2) in the English language, the entire contents of which are hereby incorporated herein by reference.

BACKGROUND OF THE INVENTION

The present invention relates to a clamp for a jet pump riser in a nuclear reactor pressure vessel and to a method for arranging a clamp over a jet pump riser in a nuclear reactor pressure vessel. More specifically the present invention relates to a clamp as described which holds the pipes together in a jet pump riser in case it would crack.

A nuclear reactor has a reactor pressure vessel, which typically has a generally cylindrical shape and is closed in both ends, e.g., by a bottom head and a removable top head, to form a closed container.

A core plate and a top guide are arranged inside the reactor pressure vessel with the top guide arranged on top of the core plate. The top guide comprises a number of holes. A reactor core in the form of fuel bundles is arranged inside the reactor pressure vessel with each fuel bundle being arranged through a hole in the top guide and resting on the core plate. Some reactors are provided with a core shroud which surrounds the core, the core plate and the top guide.

The reactor pressure vessel is filled with water covering the core and the shroud. The water in the reactor pressure vessel is arranged to flow through the core in order to cool the core during operation of the nuclear reactor. The flow is usually induced by circulation pumps arranged between the shroud and the nuclear reactor pressure vessel, which make the water flow downwards in the space between the shroud and the reactor pressure vessel (RPV) wall. The circulation pumps may be of any of a number of different types. One type of circulation pumps used in nuclear reactors of the above described type is jet pumps, in which water is injected through a narrow nozzle in a jet pump arranged between the shroud and the reactor pressure vessel. Water enters the RPV through an inlet nozzle in the RPV wall. A jet pump riser assembly is connected to the inlet nozzle, wherein the jet pump riser assembly comprises a thermal sleeve, a lower elbow, a riser pipe and an upper elbow. One end of the thermal sleeve is arranged on the outside of the RPV while the other end of the thermal sleeve is welded to a first end of the lower elbow. The second end of the lower elbow is welded to a first end of the riser pipe. The second end of the riser pipe is welded to the upper elbow. During operation of the nuclear reactor a substantial amount of water is forced through the jet pump riser assembly. The large amount of water flowing through the jet pump riser assembly results in significant hydraulic forces and vibrations exerted on the jet pump assembly. Further, a large amount of heat is generated by the core during operation of the nuclear reactor, resulting in thermal stresses being exerted on the jet pump assembly. The hydraulic forces, vibration stresses and thermal stresses might cause stress corrosion cracking (SCC) in the riser pipe elbow, which might result in the riser pipe elbow being separated from the thermal sleeve. This is of course highly undesirable.

It is desirable to provide an apparatus that provides support for a jet pump riser elbow. Such an apparatus is described in U.S. Pat. No. 6,053,652, which is directed towards a clamp assembly that provides support for the riser pipe and the lower elbow. The clamp assembly comprises a lower thermal sleeve clamp that is arranged to be secured to the thermal sleeve, and a riser clamp that is configured to be secured to the riser pipe. The lower clamp and the riser clamp are coupled together. With such a clamp assembly the stresses on the weld between the thermal sleeve and the lower elbow, as well as the weld between the lower elbow and the riser pipe, are greatly reduced. This minimizes the risk for SCC of the riser pipe assembly at the interface between the lower elbow and the riser pipe, and at the interface between the lower elbow and the thermal sleeve. With a clamp assembly according to U.S. Pat. No. 6,053,652 it may however be more difficult to inspect the weld between the lower elbow and the riser pipe, and the weld between the lower elbow and the thermal sleeve.

U.S. Pat. No. 6,108,391 describes a clamp apparatus for performing jet pump riser pipe repairs. The clamp apparatus described in the '391 patent includes a lower clamp element and an upper clamp element. The upper and lower elements are configured to be positioned at the interface between the thermal sleeve and the jet pump riser elbow. The upper and lower elements include extended ridges that are configured to fit in circumferential grooves precisely machined into the sleeve-elbow assembly on opposing sides of the interface.

One disadvantage of the clamp apparatus described in the '391 patent is that it requires grooves to be precisely machined into the sleeve-elbow assembly on opposing sides of the interface.

The apparatuses according to the prior art may be used to support the interfaces between the riser pipe, the lower elbow and the thermal sleeve in a riser pipe assembly in a reactor pressure vessel. However, there is a need for an alternative clamp apparatus that solves at least one of the problems of the prior art.

BRIEF SUMMARY OF THE DISCLOSURE

An object of the present disclosure is to describe a clamp apparatus for supporting at least one of the joints between the riser pipe, the lower elbow and the thermal sleeve in a riser pipe assembly in a reactor pressure vessel.

Another object of the present disclosure is to describe a clamp apparatus for supporting at least one of the joints between the riser pipe, the lower elbow and the thermal sleeve in a riser pipe assembly in a reactor pressure vessel, which solves at least one of the problems of the clamps according to the prior art.

These objects are achieved with a clamp apparatus according to the present disclosure.

Further advantages of the described clamp apparatus are achieved with the features of certain embodiments described herein.

According to a first aspect of the present disclosure a clamp assembly is provided for securing a thermal sleeve and an elbow in a pipe assembly in a nuclear reactor. The pipe assembly comprises a thermal sleeve with a length axis, an elbow and a riser pipe with a length axis, including a first joint between the elbow and the thermal sleeve, and a second joint between the riser pipe and the elbow.

The elbow is arranged between a reactor pressure vessel wall, and at least one of a core shroud and a core plate support ring. The clamp assembly comprises a sleeve clamp adapted to be arranged surrounding the elbow at the first joint between the elbow and the thermal sleeve, a sleeve support adapted to extend across the first joint between the elbow and the thermal sleeve, and a clamp band adapted to be arranged partly between the pipe assembly and the core shroud fixed in relation to the sleeve clamp, and in contact with the pipe assembly. The clamp assembly is characterized in that the clamp band is adapted to be in contact with the side of the elbow facing the core shroud and in that the clamp assembly also comprises at least one clamp arm with a first end being arranged to rest against at least one of the core shroud and the core plate support ring, and a spring being arranged between the clamp arm and the sleeve clamp for applying a force on the sleeve clamp away from the core shroud forcing the clamp band to be in contact with the side of the elbow facing the core shroud. The spring thereby applies a force on the elbow towards the thermal sleeve, fixing the position of the sleeve clamp in relation to the first joint between the elbow and the thermal sleeve.

With a clamp assembly according to the disclosure a force is applied on the elbow towards the thermal sleeve at the same time as the elbow is hindered from moving in relation to the thermal sleeve perpendicularly to the length axis of the thermal sleeve.

Furthermore, the clamp arms provide for a support from the core shroud. By having a spring between the clamp arms and the sleeve clamp, the core shroud is allowed to move in relation to the reactor pressure vessel, which may be the case during changes in the operation mode of the nuclear reactor. With a clamp assembly according to the present disclosure the position of the sleeve clamp is determined by the size of the clamp band, while the force of the clamp band on the elbow is determined by the spring constant of the spring and the length of the clamp arms.

The spring may comprise a compressible ring. This is a robust implementation of the spring. It is, however, possible to implement the spring in other ways. The spring may be, for example, one or more disc springs or coil springs.

The clamp assembly may comprise a spring support adapted to be arranged between the elbow and the sleeve clamp and arranged fixed in relation to said at least one clamp arm, wherein the spring is arranged between the spring support and the sleeve clamp. By the arrangement of such a spring support between the clamp arms and the spring, the arrangement of the spring is facilitated.

The sleeve support may comprise a number of studs adapted to extend from the sleeve clamp and to be spaced around the thermal sleeve. By this arrangement, future inspection of the first joint between the elbow and the thermal sleeve is facilitated as the space between the studs provide for a camera to be arranged at the first joint between the elbow and the thermal sleeve.

The sleeve clamp may comprise a lower sleeve clamp part and an upper sleeve clamp part, which are attached to each other by means of a fastening arrangement. By this division of the sleeve clamp into two parts, the arrangement of the sleeve clamp around the elbow may be performed in the reactor in a relatively simple way.

The fastening arrangement may be screws. It is also possible to use any other fastening arrangement known to men skilled in the art. However, screws are relatively simple to arrange on the sleeve clamp in the reactor.

The clamp band may be attached to the upper sleeve clamp by means of the fastening arrangement. In this way, a minimum of components are required in the clamp assembly.

The sleeve clamp may be arranged to be in loose contact with the elbow and the thermal sleeve, thereby allowing the elbow and the thermal sleeve to move in relation to the sleeve clamp. By this arrangement, the position of the sleeve clamp is defined by the length of the clamp band only.

According to a second aspect of the present disclosure a nuclear reactor is provided comprising a reactor pressure vessel with a wall, a core arranged inside the reactor pressure vessel, a core plate on which the core is arranged, a core plate support ring supporting the core plate, a core shroud surrounding the core and being arranged within the reactor pressure vessel, and a pipe assembly for transferring cooling water into the reactor pressure vessel for cooling of the core. The pipe assembly comprises a thermal sleeve with a length axis being arranged through the reactor pressure vessel wall, an elbow and a riser pipe with a length axis, including a first joint between the elbow and the thermal sleeve, and a second joint between the riser pipe and the elbow. The riser pipe and the elbow are arranged between the reactor pressure vessel wall, and at least one of the core shroud and the core plate support ring. The nuclear reactor also comprises a clamp assembly for securing the thermal sleeve and elbow, said clamp assembly comprising a sleeve clamp being arranged surrounding the elbow at the first joint between the elbow and the thermal sleeve, which sleeve clamp comprises a sleeve support extending across the first joint between the elbow and the thermal sleeve, and a clamp band which is arranged partly between the pipe assembly and the core shroud fixed in relation to the sleeve clamp, and in contact with the pipe assembly. The nuclear reactor is characterized in that the clamp band is in contact with the side of the elbow facing the core shroud and in that the clamp assembly also comprises at least one clamp arm with a first end being arranged to rest against at least one of the core shroud and the core plate support ring, a spring being arranged between the clamp arm and the sleeve clamp for applying a force on the sleeve clamp away from the core shroud forcing the clamp band to be in contact with the side of the elbow facing the core shroud, thereby applying a force on the elbow towards the thermal sleeve and fixing the position of the sleeve clamp in relation to the first joint between the elbow and the thermal sleeve.

With a clamp assembly being arranged in such a way in the nuclear reactor, a force is applied on the elbow towards the thermal sleeve at the same time as the elbow is hindered from moving in relation to the thermal sleeve perpendicularly to the length axis of the thermal sleeve. Furthermore, the clamp arms provide for a support from the core shroud. By having a spring between the clamp arms and the sleeve clamp, the core shroud is allowed to move in relation to the reactor pressure vessel, which may be the case during changes in the operation mode of the nuclear reactor. With a clamp assembly according to the present invention the position of the sleeve clamp is determined by the size of the clamp band, while the force of the clamp band on the elbow is determined by the spring constant of the spring and the length of the clamp arms.

The features described above in relation to the first aspect of the disclosure may also be implemented in the nuclear reactor according to the second aspect of the present disclosure, with the same advantages as has been described above.

The entire clamp band may be arranged below the second joint between the elbow and the riser pipe. The arrangement of the clamp band in this way provides for easy inspection of the second joint between the elbow and the riser pipe.

The nuclear reactor may comprise two clamp arms arranged on opposite sides of a plane being defined by the length axis of the riser pipe and the length axis of the thermal sleeve. Having two clamp arms arranged in this way provides stability to the clamp assembly.

The fastening arrangement may be arranged essentially parallel to the length axis of the riser pipe. This facilitates the arrangement of the fastening arrangement in the reactor.

The clamp band may essentially be U-shaped, extending from a fastening member on one side of a plane being defined by the length axis of the riser pipe and the length axis of the thermal sleeve, behind the elbow between the elbow and the core shroud, and to the fastening member on the other side of said plane.

According to a third aspect of the present disclosure, a method is provided for securing a thermal sleeve and an elbow in a nuclear reactor comprising a reactor pressure vessel with a wall, a core arranged inside the reactor pressure vessel, a core plate on which the core is arranged, a core plate support ring supporting the core plate, a core shroud surrounding the core and being arranged within the reactor pressure vessel, and a pipe assembly for transferring cooling water into the reactor pressure vessel for cooling of the core. The pipe assembly comprises a thermal sleeve with a length axis being arranged through the reactor pressure vessel wall, an elbow and a riser pipe with a length axis, including a first joint between the elbow and the thermal sleeve, and a second joint between the riser pipe and the elbow. The riser pipe and the elbow are arranged between the reactor pressure vessel wall, and at least one of the core shroud and the core plate support ring. The method comprises the steps of arranging a clamp assembly on the pipe assembly by arranging a sleeve clamp surrounding the elbow at the first joint between the elbow and the thermal sleeve, which sleeve clamp comprises a sleeve support extending across the first joint between the elbow and the thermal sleeve, and by arranging a clamp band partly between the pipe assembly and the core shroud fixed in relation to the sleeve clamp, and in contact with the pipe assembly. The method is characterized in that the clamp band is arranged in contact with the side of the elbow facing the core shroud and in that the method also comprises the steps of arranging at least one clamp arm with a first end being arranged to rest against at least one of the core shroud and the core plate support ring, arranging a spring between the clamp arm and the sleeve clamp for applying a force on the sleeve clamp away from the core shroud forcing the clamp band to be in contact with the side of the elbow facing the core shroud, thereby applying a force on the elbow towards the thermal sleeve and fixing the position of the sleeve clamp in relation to the first joint between the elbow and the thermal sleeve.

With a method according to the third aspect of the present disclosure, the clamp assembly is arranged in such a way in the nuclear reactor that a force is applied on the elbow towards the thermal sleeve at the same time as the elbow is hindered from moving in relation to the thermal sleeve perpendicularly to the length axis of the thermal sleeve. Furthermore, the clamp arms provide for a support from the core shroud. By having a spring between the clamp arms and the sleeve clamp, the core shroud is allowed to move in relation to the reactor pressure vessel, which may be the case during changes in the operation mode of the nuclear reactor. With a clamp assembly according to the present disclosure, the position of the sleeve clamp is determined by the size of the clamp band, while the force of the clamp band on the elbow is determined by the spring constant of the spring and the length of the clamp arms.

BRIEF DESCRIPTION OF THE DRAWINGS

In the following, preferred embodiments of the invention will be described with reference to the appended drawings.

DETAILED DESCRIPTION OF THE DRAWINGS

Figure 1:
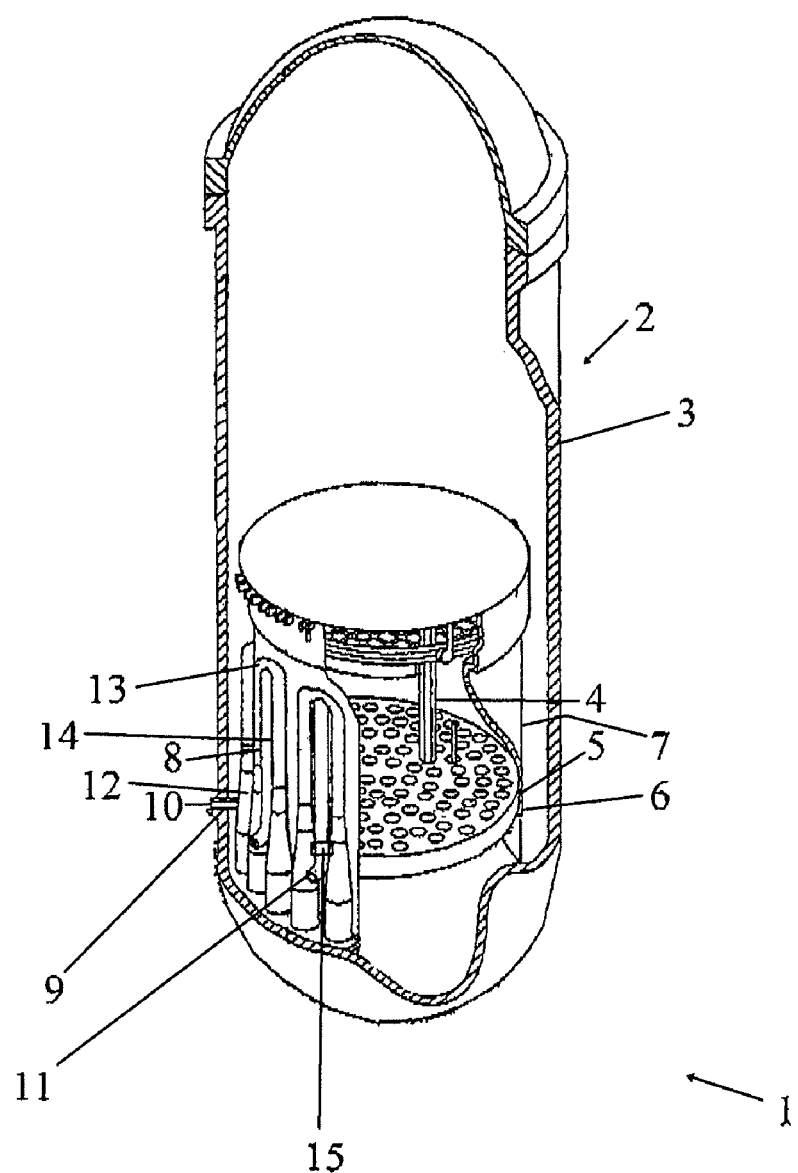
FIG. 1 shows schematically a boiling water nuclear reactor in which a clamp assembly according to the present invention may be arranged.

In the following description of certain exemplary preferred embodiments of the invention, the same reference numeral will be used for similar features in the different drawings, which are not drawn to scale.

FIG. 1 shows schematically a boiling water nuclear reactor 1 in which a clamp assembly according to the present invention may be arranged. The nuclear reactor 1 comprises a reactor pressure vessel 2 with a wall 3, a core 4 arranged inside the reactor pressure vessel 2, a core plate 5 on which the core 4 is arranged, a core plate support ring 6 supporting the core plate 5, and a core shroud 7 surrounding the core 4 and being arranged within the reactor pressure vessel 2. The nuclear reactor also comprises a number of pipe assemblies, in the form of jet pump assemblies 8, for transferring cooling water into the reactor pressure vessel 2 for cooling of the core 4. The jet pump assemblies 8 each comprises a thermal sleeve 9 with an inlet 10 being arranged through the reactor pressure vessel wall 3, an elbow 11 and a riser pipe 12 extending upwardly from the elbow 11 to a transition piece 13 and two inlet mixers 14 extending downwardly from the transition piece. Water is pumped into the inlet 10 by external pumps (not shown). The water is forced through the elbow 11 and the riser pump to the transition piece 13 where the water is forced through a nozzle (not shown) in a jet pump (not shown) to force water through the inlet mixers, thereby creating a flow of water downwards from the transition piece 13 towards the bottom of the reactor pressure vessel 2 and up through the core 4.

Figure 2:
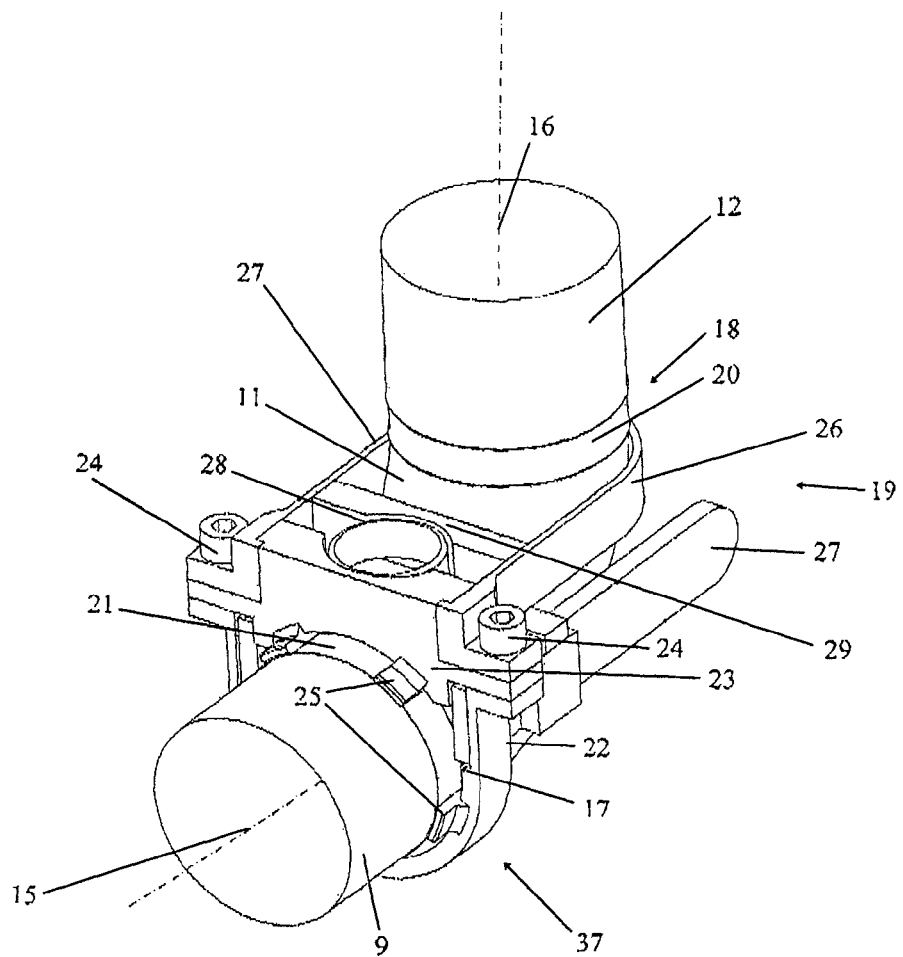
FIG. 2 shows in larger detail a clamp assembly arranged on a pipe assembly in the boiling water reactor of FIG. 1.

FIG. 2 shows in larger detail a clamp assembly 19 arranged on a pipe assembly in the boiling water reactor 1 of FIG. 1, which pipe assembly comprises a thermal sleeve 9, an elbow 11 and a riser pipe 12. The thermal sleeve 9 comprises a length axis 15 that is essentially perpendicular to the reactor pressure vessel wall 3. The riser pipe 12 comprises a length axis 16 that is essentially perpendicular to the length axis of the thermal sleeve. The pipe assembly includes a first joint 17 between the elbow 11 and the thermal sleeve 9, and a second joint 18 between the riser pipe 12 and the elbow 11. A first connector pipe 20 is arranged between the elbow 11 and the riser pipe 12. A second connector pipe 21 is arranged between the elbow 11 and the thermal sleeve 9. The riser pipe 9 and the elbow 11 are arranged between the reactor pressure vessel wall 3, and at least one of the core shroud 7 and the core plate support ring 6. The clamp assembly 19, for securing the thermal sleeve 9 and the elbow 11, comprises a sleeve clamp 37 being arranged surrounding the elbow 11 at the first joint 17 between the elbow 11 and the thermal sleeve 9. The sleeve clamp 37 comprises a lower sleeve clamp part 22 and an upper sleeve clamp part 23, which are attached to each other by means of fastening means in the form of screws 24. The screws 24 are arranged essentially parallel to the length axis 16 of the riser pipe 12. The sleeve clamp 37 comprises a sleeve support 25 in the form of studs extending from the sleeve clamp and being spaced around the thermal sleeve 9 extending across the first joint 17 between the elbow 11 and the thermal sleeve 9, and a clamp band 26 that is arranged partly between the pipe assembly and the core shroud 7, fixed in relation to the sleeve clamp 37, and in contact with the pipe assembly. The clamp band 26 is attached to the upper sleeve clamp part 23 by means of the screws 24. The clamp band 26 is in contact with the side of the elbow 11 facing the core shroud 7. The clamp assembly also comprises two clamp arms 27 arranged on opposite sides of the plane being defined by the length axis 16 of the riser pipe 12 and the length axis 15 of the thermal sleeve 9, with a first end 30 of each clamp arm 27 being arranged to rest against at least one of the core shroud 7 and the core plate support ring 6.

The clamp assembly also comprises a spring 28, in the form of a ring. The spring 28 is arranged between a spring support 29, being fixed in relation to the clamp arms 27, and the upper sleeve clamp part 23 for applying a force on the sleeve clamp 37 away from the core shroud 7 forcing the clamp band 26 to be in contact with the side of the elbow 11 facing the core shroud 7. The spring 28 thereby applies a force on the elbow 11 towards the thermal sleeve 9 and fixes the position of the sleeve clamp in relation to the first joint 17 between the elbow 11 and the thermal sleeve 9. The sleeve clamp is arranged in a loose fit with the elbow 11 and the thermal sleeve 9, thereby allowing the elbow 11 and the thermal sleeve 9 to move in relation to the sleeve clamp. The clamp band 26 is essentially U-shaped and extends from the screw 24 on one side of the plane being defined by the length axis 16 of the riser pipe 12 and the length axis 15 of the thermal sleeve 9, behind the elbow 11 between the elbow 11 and the core shroud 7 and to the screw 24 on the other side of said plane.

Figure 3:
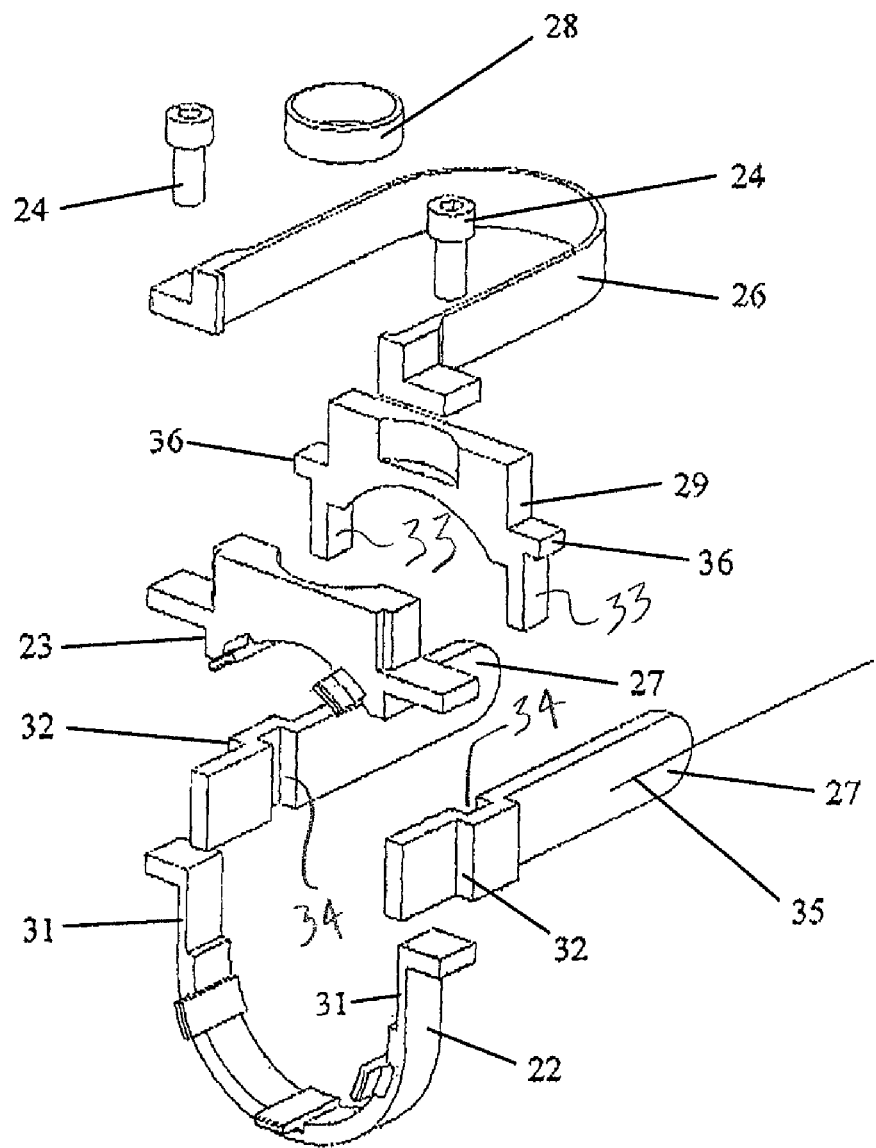
FIG. 3 is an exploded view of the clamp assembly in FIG. 2.
Figure 3A:
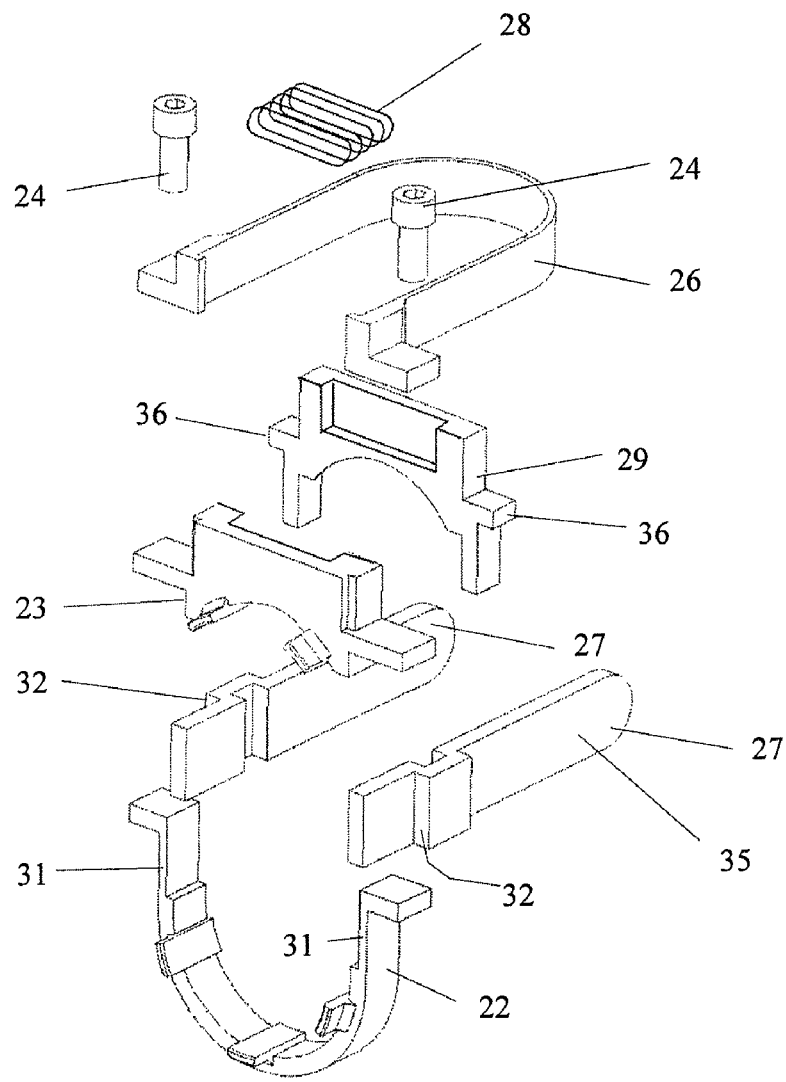
FIG. 3A depicts an exploded view of a clamp assembly similar to FIG. 3, but in which the compressible ring of FIG. 3 is replaced by a coil spring.
Figure 3B:
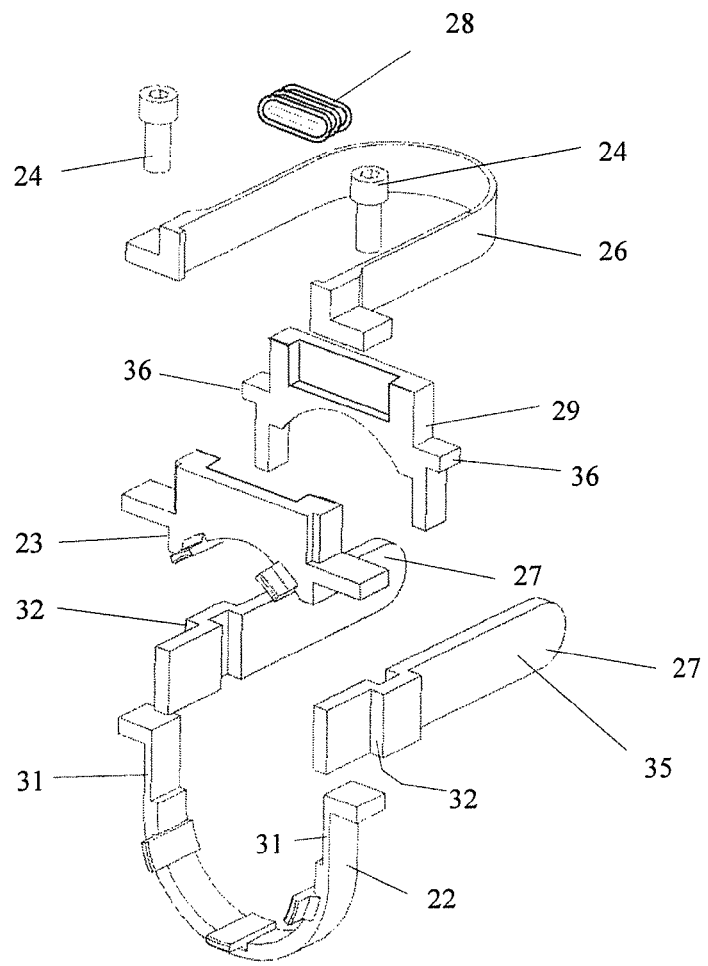
FIG. 3B depicts an exploded view of a clamp assembly similar to FIG. 3, but in which the compressible ring of FIG. 3 is replaced by an assembly of disc springs.

FIG. 3 is an exploded view of the clamp assembly in FIG. 2, showing the lower sleeve clamp part 22, the upper sleeve clamp part 23, the clamp arms 27, the spring support 29, the clamp band 26, the spring 28, and the screws 24. The clamp arms 27 have a first end 30 that is arranged to rest against at least one of the core shroud 7 and the core plate support ring 6. The clamp arms 27 also have a length axis 35. The second ends of the support arms 27 are to be arranged in the recesses 31 of the lower sleeve clamp part with the support surface 32 of the sleeve clamp arms resting against the lower sleeve clamp part 22. The spring support 29 has two support arms 33 that are arranged to be disposed in corresponding recesses 34 of the clamp arms, thus hindering the spring support from moving along the length axis 35 of the clamp arms 27. Support studs 36 on the spring support 29 are arranged to rest against the clamp arms 27. The clamp band 26 is arranged to rest against the upper side of the spring support 29. When the clamp band is fastened to the upper sleeve clamp part 23 and the lower sleeve clamp part 22 by means of the screws 24, the spring support 29 is thus hindered from moving in relation to the clamp arms 27.

The spring support 29 and the clamp arms 27 may then move only along the length axis of the clamp arms 27.

The described embodiments may be modified in many ways without departing from the spirit and scope of the present invention, which is only limited by the appended claims. For example, it is possible to have only one clamp arm 27 in a clamp assembly according to the present invention.

What is claimed is:

1. A clamp assembly for securing a thermal sleeve and an elbow in a pipe assembly in a nuclear reactor, wherein the pipe assembly comprises a thermal sleeve with a length axis, an elbow, and a riser pipe with a length axis, including a first joint between the elbow and the thermal sleeve, and a second joint between the riser pipe and the elbow, and wherein the elbow is arranged between a reactor pressure vessel wall, and at least one of a core shroud and a core plate support ring, said clamp assembly comprising a sleeve clamp adapted to be arranged surrounding the elbow at the first joint between the elbow and the thermal sleeve, and comprising sleeve support adapted to extend across the first joint between the elbow and the thermal sleeve, and a clamp band adapted to be arranged partly between the pipe assembly and the core shroud and fixed in relation to the sleeve clamp, and adapted to be in contact with the pipe assembly, wherein the clamp band is adapted to be in contact with the side of the elbow facing the core shroud, and the clamp assembly also comprises:

at least one clamp arm with a first end adapted to rest against at least one of the core shroud and the core plate support ring, and a spring arranged between the clamp arm and the sleeve clamp such that a force is applied on the sleeve clamp away from the core shroud forcing the clamp band to be in contact with the side of the elbow facing the core shroud, thereby applying a force on the elbow towards the thermal sleeve and fixing the position of the sleeve clamp in relation to the first joint between the elbow and the thermal sleeve, wherein the spring comprises a compressible ring.

2. The clamp assembly according to claim 1, comprising a spring support adapted to be arranged between the elbow and the sleeve clamp and arranged fixed in relation to said at least one clamp arm, wherein the spring is arranged between the spring support and the sleeve clamp.

3. The clamp assembly according to any claim 1, wherein the sleeve support comprises a number of studs adapted to extend from the sleeve clamp and to be spaced around the thermal sleeve.

4. The clamp assembly according to any claim 1, wherein the sleeve clamp comprises a lower sleeve clamp part and an upper sleeve clamp part, which are attached to each other by a fastening arrangement.

5. The clamp assembly according to claim 4, wherein the fastening arrangement includes screws.

6. The clamp assembly according to claim 4, wherein the clamp band is attached to the upper sleeve clamp part by the fastening arrangement.

7. The clamp assembly according to claim 1, wherein the sleeve clamp is arranged to be in contact with the elbow and the thermal sleeve in a manner allowing the elbow and the thermal sleeve to move in relation to the sleeve clamp.

8. A nuclear reactor, comprising:
a reactor pressure vessel with a wall,
a core arranged inside the reactor pressure vessel,
a core plate on which the core is arranged,
a core plate support ring supporting the core plate,
a core shroud surrounding the core and being arranged within the reactor pressure vessel,
a pipe assembly for transferring cooling water into the reactor pressure vessel for cooling of the core, wherein the pipe assembly comprises a thermal sleeve with a length axis being arranged through the reactor pressure vessel wall, an elbow and a riser pipe with a length axis, including a first joint between the elbow and the thermal sleeve and a second joint between the riser pipe and the elbow, and wherein the riser pipe and the elbow are arranged between the reactor pressure vessel wall and at least one of the core shroud and the core plate support ring,
a clamp assembly for securing the thermal sleeve and the elbow, said clamp assembly comprising a sleeve clamp being arranged surrounding the elbow at the first joint between the elbow and the thermal sleeve, which sleeve clamp comprises a sleeve support extending across the first joint between the elbow and the thermal sleeve, and a clamp band that is arranged partly between the pipe assembly and the core shroud fixed in relation to the sleeve clamp, and in contact with the pipe assembly,
wherein the clamp band is in contact with the side of the elbow facing the core shroud and the clamp assembly also comprises:
at least one clamp arm with a first end arranged to rest against at least one of the core shroud and the core plate support ring, and
a spring arranged between the clamp arm and the sleeve clamp such that a force is applied on the sleeve clamp away from the core shroud forcing the clamp band to be in contact with the side of the elbow facing the core shroud, thereby applying a force on the elbow towards the thermal sleeve and fixing the position of the sleeve clamp in relation to the first joint between the elbow and the thermal sleeve, wherein the entire clamp band is arranged below the second joint between the elbow and the riser pipe.

9. The nuclear reactor according to claim 8, wherein the spring comprises a compressible ring.

10. The nuclear reactor according to claim 8, comprising a spring support arranged between the elbow and the sleeve clamp and arranged fixed in relation to said at least one clamp arm, wherein the spring is arranged between the spring support and the sleeve clamp.

11. The nuclear reactor according to claim 8, comprising two clamp arms arranged on opposite sides of a plane being defined by the length axis of the riser pipe and the length axis of the thermal sleeve.

12. The nuclear reactor according to claim 8, wherein the sleeve support comprises a number of studs extending from the sleeve clamp and being spaced around the thermal sleeve.

13. The nuclear reactor according to claim 8, wherein the sleeve clamp comprises a lower sleeve clamp part and an upper sleeve clamp part, which are attached to each other by means of a fastening arrangement.

14. The nuclear reactor according to claim 13, wherein the fastening arrangement includes screws.

15. The nuclear reactor according to claim 13, wherein the clamp band is attached to the upper sleeve clamp part by the fastening arrangement.

16. The nuclear reactor according to claim 8, wherein the fastening means are arranged essentially parallel to the length axis of the riser pipe.

17. The nuclear reactor according to claim 8, wherein the length axis of the riser pipe is essentially perpendicular to the length axis of the thermal sleeve.

18. The nuclear reactor according to claim 8, wherein the sleeve clamp is arranged with respect to the elbow and the thermal sleeve in a manner allowing the elbow and the thermal sleeve to move in relation to the sleeve clamp.

19. The nuclear reactor according to claim 8, wherein the clamp band is essentially U-shaped and extends from a fastening member on one side of a plane being defined by the length axis of the riser pipe and the length axis of the thermal sleeve, behind the elbow, between the elbow and the core shroud, and to a fastening member on the other side of said plane.

* * * * *